United States Patent
Nader

(10) Patent No.: US 9,063,780 B2
(45) Date of Patent: Jun. 23, 2015

(54) TECHNIQUE OF SCHEDULING TASKS IN A SYSTEM

(75) Inventor: Ali Nader, Malmö (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 318 days.

(21) Appl. No.: 13/578,245

(22) PCT Filed: Feb. 11, 2011

(86) PCT No.: PCT/EP2011/052036
§ 371 (c)(1),
(2), (4) Date: Oct. 15, 2012

(87) PCT Pub. No.: WO2011/101294
PCT Pub. Date: Aug. 25, 2011

(65) Prior Publication Data
US 2013/0042251 A1    Feb. 14, 2013

Related U.S. Application Data

(60) Provisional application No. 61/310,453, filed on Mar. 4, 2010.

(30) Foreign Application Priority Data

Feb. 22, 2010    (EP) .................................... 10001785

(51) Int. Cl.
G06F 9/46    (2006.01)
G06F 9/48    (2006.01)

(52) U.S. Cl.
CPC .................................... *G06F 9/4881* (2013.01)

(58) Field of Classification Search
None
See application file for complete search history.

(56) References Cited

U.S. PATENT DOCUMENTS

| | | | |
|---|---|---|---|
| 6,668,269 B1 | 12/2003 | Kamada et al. | |
| 6,859,926 B1 * | 2/2005 | Brenner et al. | 718/100 |
| 7,058,947 B1 * | 6/2006 | Raja et al. | 718/104 |
| 2003/0037091 A1 * | 2/2003 | Nishimura et al. | 709/103 |
| 2003/0187908 A1 | 10/2003 | Boucher | |
| 2004/0216106 A1 | 10/2004 | Kalla et al. | |
| 2006/0136988 A1 * | 6/2006 | Raja et al. | 726/1 |
| 2009/0044060 A1 | 2/2009 | Noll et al. | |
| 2009/0100431 A1 * | 4/2009 | Doyle et al. | 718/103 |

FOREIGN PATENT DOCUMENTS

WO    03/065214 A1    8/2003

OTHER PUBLICATIONS

European Search Report, dated Aug. 9, 2010, in connection with European Patent Application No. EP 10 00 1785.
PCT International Search Report, mailed Jul. 19, 2011, in connection with International Application No. PCT/EP2011/052036.

(Continued)

*Primary Examiner* — Emerson Puente
*Assistant Examiner* — Dong Kim
(74) *Attorney, Agent, or Firm* — Leffler Intellectual Property Law, PLLC

(57) ABSTRACT

A technique for scheduling tasks in a system is provided. A method implementation of this technique comprises the steps of providing at least one association between a task and a range of priorities for the task and using the at least one association for the task scheduling. The task scheduling may be provided by a task scheduling unit having access to a memory unit.

17 Claims, 4 Drawing Sheets

(56) References Cited

OTHER PUBLICATIONS

PCT Written Opinion, mailed Jul. 19, 2011, in connection with International Application No. PCT/EP2011/052036.

International Preliminary Report on Patentability, mailed May 15, 2012, in connection with International Application No. PCT/EP2011/052036.

* cited by examiner

TECHNIQUE OF SCHEDULING TASKS IN A SYSTEM

CROSS-REFERENCE TO RELATED APPLICATIONS

This application claims priority under 35 U.S.C. §119 to European Patent Application No. 10001785.4, filed Feb. 22, 2010, which is hereby incorporated herein by reference in its entirety. This application also claims the benefit of U.S. Provisional Application No. 61/310,453, filed Mar. 4, 2010, which is hereby incorporated herein by reference in its entirety.

TECHNICAL FIELD

The present invention generally relates to the technical field of scheduling tasks in a system. In particular, the invention relates to a technique of scheduling tasks based on at least one association between a task and a range of priorities for the task.

BACKGROUND

Electronic systems, like data processing systems, electronic devices, mobile communication terminals and the like, use task scheduling for controlling the order and resource access time of tasks to be executed within the system. Task scheduling is of particular relevance for the system in case tasks to be executed within the system are to concurrently use the same system resources, e.g., processor time, communication bandwidth, memory and the like. In this case, the task scheduling decides which of the tasks competing for the same system resources are executed with a higher priority than other tasks, i.e., to which tasks a longer resource access time is allocated.

In known mobile communication systems, a static look-up table comprising a fixed priority for each task to be executed in the system is used for the task scheduling. For example, in case two tasks are to concurrently use the same system resources, the task to which the higher priority is allocated in the static look-up table is executed before the other task. However, since the priorities provided in the static look-up table are fixed values (i.e., assigned as factory default settings), the same tasks always have higher priorities than other tasks and are therefore executed more preferentially than the other tasks. Moreover, the fixed priority distribution included in the static look-up table is provided such that a stable system performance in all common system situations is guaranteed, i.e., no system starvation occurs. However, task scheduling based on a static look-up table provides no flexibility regarding task priority values so that no dynamic task scheduling can be provided.

Other known systems use task scheduling algorithms, e.g., Round-Robin, Fair Queue, Weighted Fair Queue, Priority Inversion, etc., for task scheduling. Such task scheduling algorithms have the aim of improving the average task execution performance of the system. However, the known task scheduling algorithms are not flexible enough to be adapted to more seldom occurring system situations. For example, in case of system failure or deterioration of system performance, the task scheduling aim is to keep the system operational and not to improve the average task execution performance within the system. Thus, depending on the status of the system, it may be desired to execute certain tasks with a higher priority than other tasks. However, the known task scheduling algorithms are not adapted to dynamically and flexibly change priorities allocated to tasks.

Document US 2009/0044060 A1 discloses a method for supervising task-based data processing in a real time operation system. Task identifiers stored in a log memory of the system provide a task history pattern of scheduled tasks. Based on the task history pattern, failures to appear in the system can be detected. However, only past task scheduling logs are considered for the failure prediction so that the task-based data processing lacks flexibility.

Thus, the problem of providing flexible and dynamic task scheduling within a system arises.

SUMMARY

Accordingly, there is a need for a technique of scheduling tasks in a system, which is avoiding at least some of the disadvantages outlined above.

This need is satisfied according to a first aspect by a method of scheduling tasks in a system comprising the steps of providing at least one association between a task and a range of priorities for the task and using the at least one association for the task scheduling.

The system may be any kind of electronic entity that is capable of scheduling a plurality of tasks, e.g., a computer system, an electronic device, a mobile communication terminal, a mobile phone and the like. The system may be a mobile or fixed-line device. The system may also be a Layer 1 processing system. In particular, the system may be any kind of electronic entity that is capable of executing at least one task. The tasks to be scheduled in the system may be any kind of services, processes, threads, workflows or data flows that are adapted to be processed. Moreover, execution or processing of a task may cause a consumption of at least one of processing power, communication bandwidth and energy within the system.

The range of priorities for the task may be any kind of data arrangement or structure indicating a plurality of priorities assigned to at least one task, e.g., a subsequent or non-subsequent order of priority values. In particular, the range of priorities may comprise a sequential or non-sequential order of priority values. The range of priorities may be defined by a base priority and a number of subsequent priorities. Moreover, the range of priorities may be defined by a lowest and a highest possible priority within a range of priorities. Furthermore, the association between a task and the range of priorities may comprise any kind of relation between the task and the range of priorities, e.g., by means of a direct or indirect assignment or allocation. A range of priorities associated with a task may also be related to a range of priorities associated with at least one further task.

In order to provide a dynamic task scheduling, the method may comprise the further step of providing a priority indication of a current priority of the task within the range of priorities. The current priority indication may be an actual priority allocated to a task that is valid for a certain point of time or within a certain period of time. Moreover, the current priority indication may comprise any kind of relation between the current priority and the range of priorities, e.g., based on a copy of the association between the task and the range of priorities and/or using a pointer for indicating the current priority.

Depending on a current priority indication of a task, one of a plurality of tasks to be executed in the system may be selected. In other words, depending on current priorities allocated to tasks within ranges of priorities, at least one task may be selected for execution.

According to one aspect, the indication of a current priority is not static and may be dynamically changed. For example, the current priority indication may be increased or decreased by at least one priority value within the range of priorities. The increasing or decreasing of the current priority indication may be provided in a sequential manner. However, it is also possible that at least one priority is skipped for the increasing or decreasing of the current priority indication. Thus, any priority value within the range of priorities may be allocated to a task.

A current priority indication of a task may also be related to a current priority indication of at least one further task. For example, a dynamic changing of the current priority indication for a first task may aim to provide the same current priority indication as for a second task. The dynamic changing of the current priority indication for a first task may also aim to provide a higher or lower current priority indication than for at least one further task.

According to another aspect, the method comprises the steps of changing the current priority of a task selected to be executed in the system to one of the lowest possible priority and an initial priority value within its range of priorities. This changing of a priority value allocation may be provided for a task after it has been executed in the system.

In order to provide tasks that have not been executed with a higher likelihood of being executed in the future, the method may comprise the further step of increasing the current priority of at least one task that has not been selected to be executed in the system within its range of priorities. For example, an allocated current priority value may be increased by one value.

The method may comprise the further step of changing the current priorities of all tasks to at least one of the lowest possible priority and an initial priority value within its ranges of priorities. This initial priority value adaptation may be provided when the system is started or when a status relating to the system changes, e.g., the system performance falls below a predetermined level.

Although the range of priorities may comprise a subsequent order of priority values, an initial priority value allocated to a task does not have to be a lowest possible priority value within the range of priorities. Thus, the method may comprise the further step of providing an initial priority value for the task within the range of priorities. This initial priority value may be an allocated base value within the range of priorities. The lowest possible priority value within the range of priorities may also reflect a lower priority than the initial priority value.

In order to provide an effective task scheduling, the method may comprise the further step of determining whether at least two of a plurality of tasks to be executed in the system are to concurrently use the same resources relating to the system. The resources relating to the system may be any kind of system resources that can be accessed by a task, e.g., processor time, communication bandwidth, memory and the like. In particular, the system resources may be resources that can only be accessed by one task at the same time so that no simultaneous resource access is possible. The system resources may also be resources that can only be accessed by a limited, e.g., a predetermined, number of tasks at the same time.

To further optimize the task scheduling, the method may comprise at least one of the steps, in case the at least two tasks have the same current priorities, of selecting one of the plurality of tasks depending on waiting times of the at least two tasks for being executed in the system, selecting one of the plurality of tasks depending on the highest possible priorities within the ranges of priorities associated with the tasks, and randomly selecting one of the plurality of tasks. The selecting step may further comprise a selection of the task for execution, e.g., execution within the system.

According to one aspect, the at least one association between a task and a range of priorities for the task may be a task priority table that is adapted to comprise for each of a plurality of tasks a range of priorities.

The task scheduling may further take a status relating to the system into consideration. For example, a status relating to the system may first be determined and based on the determined status, different priorities or priority ranges may be allocated to the tasks. The status relating to the system may concern any kind of situation, scenario or condition relating to the system. For example, in case the system is a mobile communication terminal, the status relating to the system may be at least of an idle mode of the system, a situation of bad data reception by the system, and a situation of an ongoing user data reception by the system from a communication network. In case the system is a dual Subscriber Identity Module (SIM) card mobile phone, a status change may be related to a detection of more than one SIM card within the mobile phone, a detection that at least one SIM card is inserted into the mobile phone, a switching to one SIM card, or a switching from a first SIM card to a second SIM card. The determining of at least one status relating to the system may comprise any kind of data obtaining, measurement or data detection. In particular, the determining of at least one status relating to the system may comprise a receiving of data relating to the system from within or from outside the system, e.g., from a communication network.

In one aspect, a first task of a plurality of tasks to be scheduled in the system relates to a reading of broadcast system information on a first frequency and a second task of the plurality of tasks relates to cell search measurements on one or more second frequencies different from the first frequency. Such tasks may be scheduled in case the system is a mobile communication terminal adapted to send and receive in a cellular communication network.

According to another aspect, a computer program product is provided. The computer program product comprises program code portions for performing one or more of the steps or one or more of the method aspects described herein, when the computer program product is executed on one or more computing devices, in particular, one or more components of a microprocessor. The computer program product may be stored on a computer-readable recording medium such as a permanent or rewritable memory, a CD-Rom, or a DVD. The computer program product may also be provided for download via one or more computer networks, such as the Internet, a cellular telecommunication network or a wireless or wired Local Area Network (LAN).

As for a hardware aspect, an electronic device adapted to schedule tasks is provided. The electronic device comprises a task scheduling unit adapted to provide at least one association between a task and a range of priorities for the task, wherein the task scheduling unit is further adapted to use the at least one association for the task scheduling.

The electronic device may be any kind of wired or mobile communication device like a mobile station, a mobile telephone, a Personal Digital Assistant (PDA), a network card, a User Equipment (UE) or other mobile communication apparatus. The mobile communication apparatus may be any apparatus that is capable of communicating via an air interface with a network node, e.g., a NodeB or a base station being deployed in a mobile communication network working according to a Third Generation Partnership Project (3GPP) standard. The electronic device may also be adapted to provide Layer 1 processing.

The task scheduling unit may be adapted to provide a priority indication of a current priority of the task within the range of priorities.

The task scheduling unit may also be adapted to select one of a plurality of tasks to be executed in the device depending on the priority indication.

The task scheduling unit may further be adapted to change the current priority of a task selected to be executed in the system to one of the lowest possible priority and an initial priority value within its range of priorities.

Furthermore, the task scheduling may be adapted to increase the current priority of at least one task that has not been selected to be executed in the device within its range of priorities.

The task scheduling unit may also be adapted to change the current priorities of all tasks to at least one of the lowest possible priority and an initial priority value within its range of priorities.

The task scheduling unit may be adapted to provide an initial priority value for the task within the range of priorities.

The task scheduling unit may be adapted to determine whether at least two of a plurality of tasks to be executed in the system are to concurrently use the same resources relating to the device.

The task scheduling unit may also be adapted to change a current priority indication of a task depending on a current priority indication of at least one further task.

The task scheduling unit may further be adapted, in case the at least two tasks have the same current priorities, to provide at least one of selecting one of the plurality of tasks depending on waiting times of the at least two tasks for being executed in the device, selecting one of the plurality of tasks depending on the highest possible priorities within the ranges of priorities associated with the tasks, and randomly selecting one of the plurality of tasks.

As for a further aspect, a task priority table is provided. The task priority table is adapted to include for each of a plurality of tasks a range of priorities.

BRIEF DESCRIPTION OF THE DRAWINGS

In the following, the invention will be described with reference to exemplary embodiments illustrated in the drawings, wherein.

DETAILED DESCRIPTION

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to task priority tables, it will be apparent to the skilled person that the invention can also be practiced in context with any kind of association between a task and a range of priorities. Moreover, while the embodiments will be described with reference to systems, the invention can also be practiced with electronic mobile and non-mobile devices. Furthermore, while the embodiments will be described with reference to system resources that can only be accessed by one task at the same time, the system resources may also be resources that can only be accessed by a limited number of tasks at the same time.

Moreover, those skilled in the art will appreciate that the functions and processes explained herein below may be implemented using software functioning in conjunction with programmed microprocessors or general-purpose computers. It will also be appreciated that while the embodiments are primarily described in the form of methods and apparatuses, the invention may also be embodied in a computer program product as well as in a system comprising a computer processor and a memory coupled to the processor, wherein the memory is encoded with one or more programs that may perform the functions disclosed herein.

Figure 1:
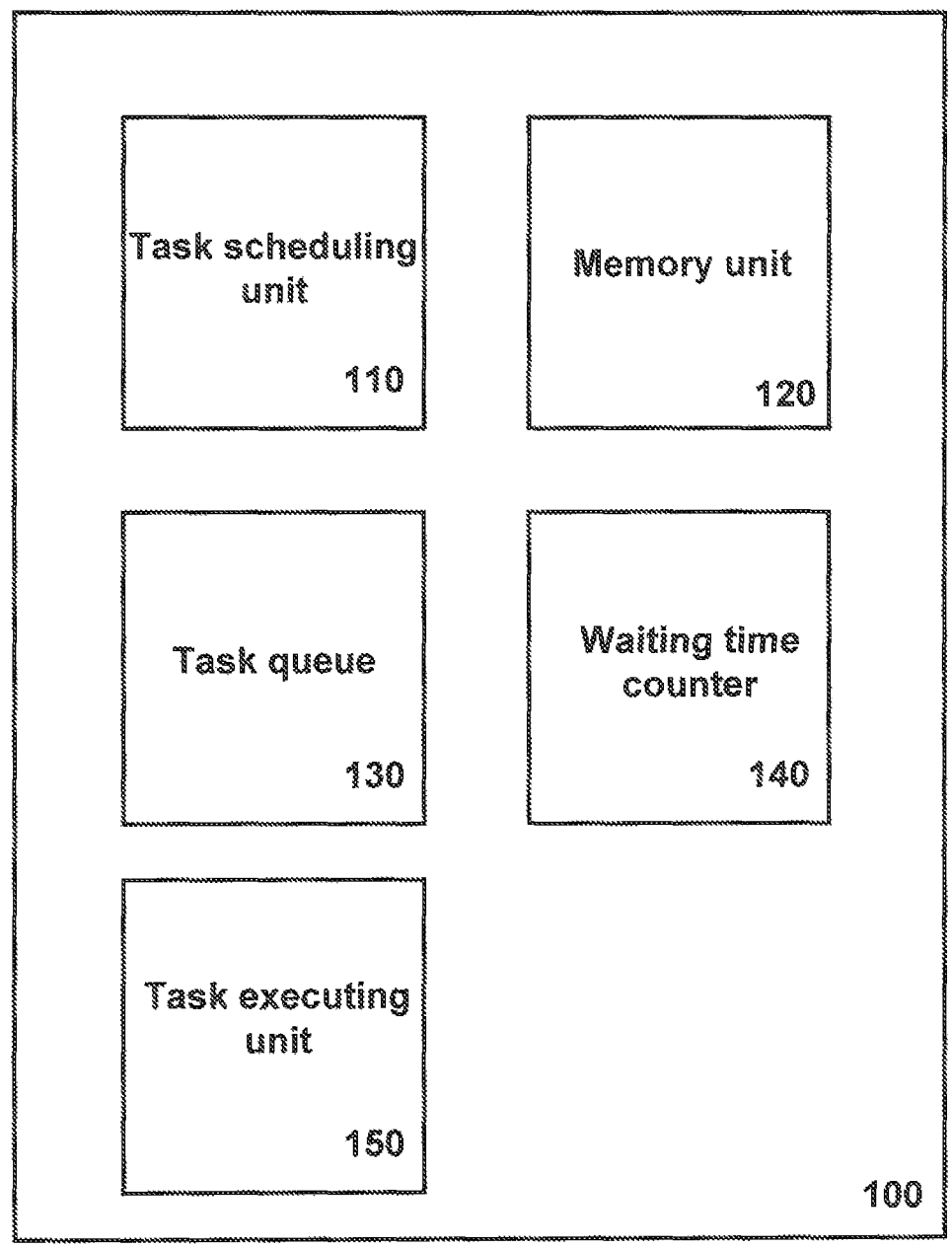
FIG. 1 is a schematic block diagram showing an implementation of a system for task scheduling.

FIG. 1 shows a schematic block diagram illustrating an embodiment of a system 100. System 100 is an electronic device adapted to schedule tasks and comprises a task scheduling unit 110, a memory unit 120, a task queue 130, a waiting time counter 140, and a task executing unit 150. System 100 can for example be implemented as a mobile communication terminal working according to the 3GPP Wideband Code Division Multiple Access (WCDMA) standard.

Task scheduling unit 110 is adapted to provide at least one association between a task and a range of priorities for the task. For example, task scheduling unit 110 may obtain a task priority table including a range of priorities associated with each task from memory unit 120. Accordingly, memory unit 120 is capable of storing a plurality of task priority tables. Task queue 130 stores a plurality of tasks that are ready to be executed by task executing unit 150. In particular, task queue 130 may store indications of tasks that are ready to be executed in system 100. Accordingly, waiting time counter 140 determines the time that the tasks are waiting to be executed by task executing unit 150. For this, waiting time counter may log the waiting times. The waiting time data may be stored in memory unit 120. Task executing unit 150 is executing the tasks in accordance with the task scheduling provided by task scheduling unit 110. For example, task executing unit 150 may comprise a microprocessor for executing a data processing task or a radio access unit for executing a data sending and receiving task.

Figure 2:
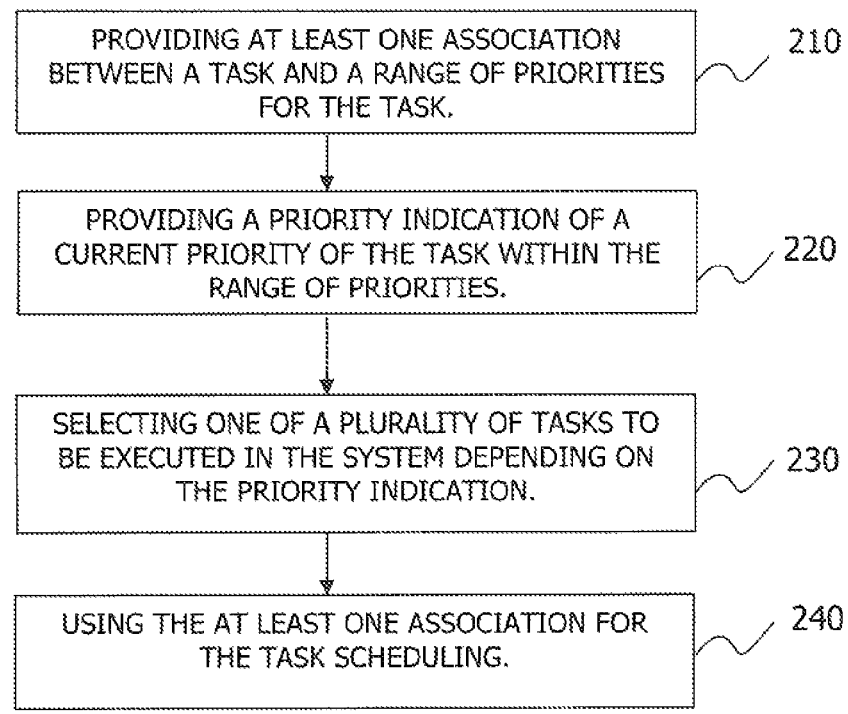
FIG. 2 is a flow chart showing an embodiment of a first method of task scheduling in a system.

FIG. 2 is a flow chart illustrating an embodiment of a first method 200 of task scheduling in system 100. Method 200 will be explained with reference to FIGS. 1 and 2.

Method 200 starts in step 210 by providing at least one association between a task and a range of priorities for the task. For example, the at least one association may be provided such that task scheduling unit 110 reads an association from memory unit 120. The association between a task and a range of priorities may be included in a task priority table stored in memory unit 120.

In subsequent step 220, a priority indication of a current priority of the task within the range of priorities is provided. For example, a current priority indication is allocated to a range of priorities and task scheduling unit 110 reads the current priority indication. The current priority indication may be provided within memory unit 120 or any other unit of system 100.

In step 230, one of a plurality of tasks to be executed in system 100 is selected depending on the current priority indication. For example, different current priorities are allocated to each range of priorities. Thus, a task having a higher current priority indication than another task may be selected by task scheduling unit 110 for execution. As a next step 240, the at least one association is used for the task scheduling. For example, the task selected in step 230 by task scheduling unit 110 is provided by task scheduling unit 110 to task executing unit 150. Thereafter, task executing unit 150 executes the selected task.

Since associations between tasks and ranges of priorities for the tasks are provided, the current priorities allocated to the tasks may be dynamically changed. Thus, a flexible task scheduling is provided.

Figure 3:
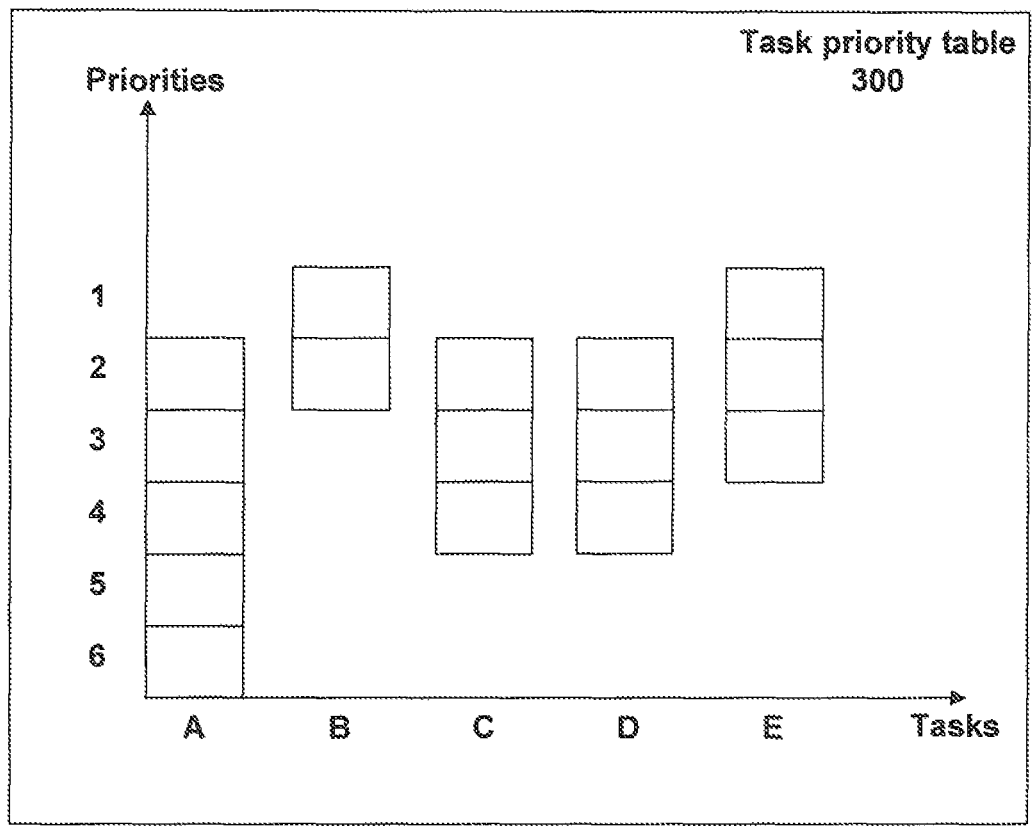
FIG. 3 is a schematic block diagram showing an implementation of a task priority table.

FIG. 3 shows a schematic block diagram illustrating an embodiment of a task priority table 300. Task priority table 300 may be used by system 100 shown in FIG. 1. In particular, task priority table 300 may be stored in memory unit 120 shown in FIG. 1. Task priority table 300 may also be used in method 200 of FIG. 2.

Task priority table 300 comprises a plurality of associations between tasks and priorities ranges. In particular, five tasks A to E are associated with respective priority ranges. Tasks A to E are tasks that can be executed by task executing unit 150 shown in FIG. 1. In task priority table 300, lower priority values indicate a higher priority. Thus, a priority range from lowest priority indication 6 to highest priority indication 2 is allocated to task A, priority values 1 and 2 are allocated to task B, priority ranges from lowest priority indication 4 to highest priority indication 2 are allocated to tasks C and D, and a priority range from lowest priority indication 3 to highest priority indication 1 is allocated to task E. Accordingly, the base priority value of task A is 6, the base priority value of task B is 2, the base priority values of tasks C and D are 4, and the base priority value of task E is 3. Furthermore, initial priority values may be allocated to each priority range. For example, although the lowest possible priority indication for task A is 6, an initial priority indication of 4 may be allocated to task A. Moreover, a virtual highest priority indication may be allocated to each range of priorities. In the embodiment according to FIG. 3, each of the priority ranges comprises a sequential order of priority values. However, a non-sequential order, e.g., 1, 2, 5 and 6 for task B, may also be provided.

For each of the priority ranges shown in task priority table 300, a current priority indication may be provided. In particular, a current priority indication may be allocated to each of the priority ranges. This current priority indication may be implemented based on a pointer. Moreover, a copy of task priority table 300 may provided and the current priority indication may be associated with respective priority values within the copy.

In the course of task scheduling, the allocated current priority indications may be dynamically changed. For example, in case an initial priority indication of 5 is allocated to task A, the allocated current priority of task A may be incremented to priority indication 4. Further to an increase of allocated current priority indications, the current priority indications may as well be decreased. Moreover, the increasing or decreasing may cover a skipping of subsequent priority values within the ranges of priorities. For example, a current priority indication may be decreased in one step from 3 to 6. However, the current priority indications may only be changed within the ranges of priorities.

The dynamic changing of the current priority indication for task A may for example be performed such that the same current priority indication as for task C is provided. For this, task A may monitor the current priority value allocated to task C. The dynamic changing of the current priority indication for task A may also aim to provide a higher or lower current priority indication than for tasks D and E.

According to a further embodiment, a plurality of task priority tables are provided. The plurality of task priority tables may have the same basic structures as task priority table 300. For example, a plurality of task priority table 300 may be stored in memory unit 120 shown in FIG. 1. In this case, the priority ranges included in each priority table are adapted to different system situations. In particular, the plurality of task priority tables may be adapted such that the task scheduling provides efficient scheduling results depending on the status of system 100. For example, in case system 100 is a mobile communication terminal and experiencing a deterioration of the transmission quality over its air interface, a different one of the plurality of task priority table provided in memory unit 120 may be selected for task scheduling than in case the mobile communication terminal 100 is operating in a normal network coverage scenario. In this case, the priority ranges of the selected task priority table are adapted to the deteriorated network coverage situation. For example, the priority ranges of tasks that are relevant for operating the air interface include generally higher priority indications.

As a further example, in case system 100 is a dual SIM card mobile phone adapted to house at least two SIM cards, a status change may be indicated if more than one SIM card is detected within the mobile phone. The detection may be dynamic such that a status change is indicated once a second SIM card is inserted in the mobile phone. A status change may also be indicated in case it is switched from one SIM card to another SIM card, e.g., due to different tariffs in different areas. Moreover, different priorities may be assigned to the SIM cards depending on the detected status change. For example activities relating to a first SIM card may be assigned a higher priority than activities relating to a second SIM card. Thus, in case a resource conflict between a first task relating to the first SIM card and second task relating to the second SIM card occurs, access to the resource is assigned to the task relating to the SIM card with the higher priority.

Figure 4:
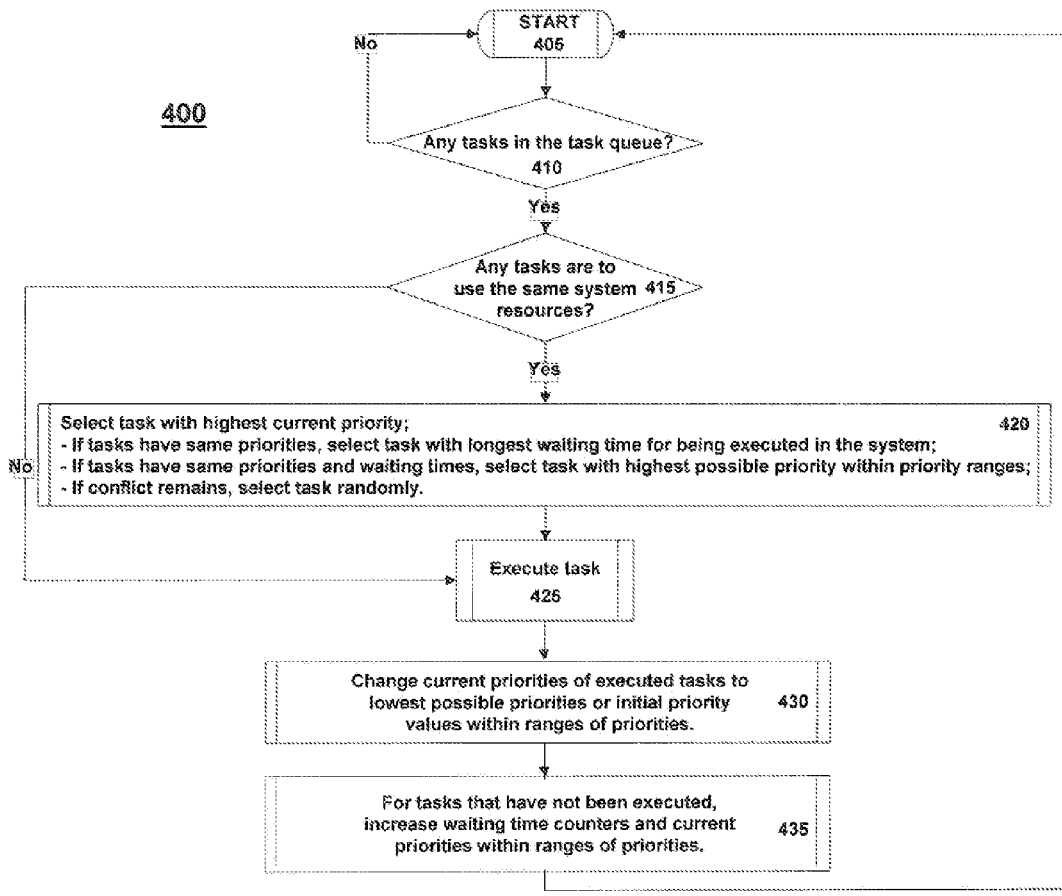
FIG. 4 is a flow chart showing an embodiment of a second method of task scheduling in a system.

FIG. 4 is a flowchart illustrating an embodiment of a second method 400 of scheduling tasks in a system. The system may be the system 100 shown in FIG. 1. Moreover, method 400 may use the task priority table 300 shown in FIG. 3.

Method 400 starts with step 405 in which an initialization of the task scheduling method is provided. In particular, upon start of method 400 in step 405, current priority indications allocated to priority ranges are decreased to base priority values. For example, with reference to task priority table 300 shown in FIG. 3, all current priority indications of tasks A to E are decreased to the lowest possible priority values. In subsequent step 410, task scheduling unit 110 determines whether any tasks are waiting in task queue 130 for being executed, i.e., whether any tasks are ready to be served by task executing unit 150 within system 100. In case no tasks are waiting for being executed, method 400 returns to starting step 405. In this case, the initialization step may be omitted in step 405.

In case at least one task is waiting in task queue 130 for being executed, it is determined in next step 415 whether any of the tasks are to use the same system resources. In particular, it is determined whether at least two tasks are to concurrently use the same system resources, e.g., processor time, communication bandwidth and/or memory. Task scheduling unit 110 may for example determine whether at least two tasks are to concurrently access a processor or a communication interface provided in task executing unit 150.

In case it is determined in step 415 that at least two tasks are to concurrently use the same system resources, one of the at least two tasks is selected based on the conditions indicated in step 420. For performing the selection according to step 420, task scheduling unit 110 accesses task priority table 300 stored in memory unit 120. Moreover, task scheduling unit 110 has access to the current priority indications allocated to the respective tasks within the ranges of priority.

As an example for the task selection according to step 420, it assumed that a current priority value of 5 is allocated to task A, a current priority value of 1 is allocated to task B, a current priority value of 3 is allocated to task C, a current priority value of 3 is allocated to task D, and a current priority value of 3 is allocated to task E. According to this example, task B has the highest current priority of 1 and is therefore selected in step 420 by task scheduling unit 110.

However, in case the same current priority values are allocated to two tasks, the task having the longer waiting time for being executed in system 100 is selected by task scheduling unit 110. For implementing this condition, waiting time counter 140 logs the waiting times of each of tasks A to E. For example, it is assumed that current priority values of 2 are allocated to tasks B and C and current priority values of 3 are allocated to tasks A, D and F. Moreover, it is assumed that task B has a longer waiting time than task C for being executed by task executing unit 150. In this case, task B is selected in step 420.

In case two tasks have the same waiting times for being executed in system 100 and the same current priority values are allocated to the two tasks, the task having the highest possible priority value within the ranges of priorities is selected. For example, assume that task A has a priority range from 6 to 4, a current priority value of 5 and a waiting time of 600 ms, and task B has a priority range from 6 to 3, a current priority value of 5 and a waiting time of 600 ms, then task B is selected for being executed.

In case a conflict still remains, one of the tasks may be randomly selected for being executed by task executing unit 150 in system 100. For example, in case tasks B and C have the same waiting time for being executed in the system, one of tasks B and C may be randomly selected for being executed by task executing unit 150.

The order of the conditions provided in step 420 may also be changed. For, example, it may as a first condition be determined which task has the longest waiting time for being executed by task executing unit 150. Moreover, additional conditions may be provided. Such additional conditions may be provided before or after any condition of step 420.

Thereafter, in step 425, the task selected in step 420 is executed by task executing unit 150. A task may also be executed in step 425 in case it has been determined in step 415 that no tasks are to concurrently use the same system resources. For example, it has been determined in step 415 that one task intends to access system communication resources and another task intends to access data processing resources.

After the execution of the at least one task in step 425, the current priorities of executed tasks are changed in step 430 to the lowest possible priorities or initial priority values within the ranges of priorities. For example, in case a current priority value of 3 is allocated to task A within task plurality table 300 and task A is executed by executing unit 150, the lowest possible priority value of 6 is after the execution allocated to task A. Moreover, in case an initial priority value of 5 is defined for task A, after execution of task A, an allocated current priority value of 3 may be changed to initial priority value 5.

In subsequent step 435, for tasks that have not been executed by task executing unit 150 in step 425, the waiting time counter 140 and the current priorities within its ranges of priorities are increased. For example, in case task A has been executed and tasks B to E have not been executed, the current priorities allocated to tasks B to E are increased. In case the priorities allocated to tasks B to E are already the highest possible priorities within the ranges of priorities, no further priority increase is provided. Thereafter, method 400 returns to initial starting step 405.

According to a further embodiment, in case a status relating to the system changes, the current priority values allocated to tasks A to E may be changed to the lowest possible priority values within the ranges of priorities or initial priority values. For example, in case system 100 is a mobile communication terminal and the transmission quality of the mobile communication terminal deteriorates, upon detection that the transmission quality falls below a predetermined threshold value, priority value 6 is allocated to task A, priority value 2 is allocated to task B, priority value 4 is allocated to tasks C and D, and priority value 3 is allocated to task E.

The task scheduling described herein provides a weighted share of resource access time to tasks intending to access the same system resources at the same time. In particular, a dynamic and flexible task scheduling is provided.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of scheduling tasks in a system comprising:
   providing at least one task priority table;
   determining whether a first and a second task to be executed in the system are to concurrently use the same resources relating to the system; and
   using the at least one task priority table and waiting time for the task scheduling in case it has been determined that the first task and the second task are to concurrently use the same resources relating to the system,
   wherein:
   the at least one task priority table is adapted to comprise for a first task a first sequential or non-sequential order of priority values including a first lowest possible priority value within the order of priority values and a first highest possible priority value within the order of priority values, and for a second task a sequential or non-sequential order of priority values including a second lowest possible priority value within the order of priority values and a second highest possible priority value within the order of priority values, the first and second sequential or non-sequential orders of priority values overlap, and the first and second tasks are to concurrently use the same resources relating to the system,
   the first lowest, second lowest, first highest and second highest possible priority values differ from each other, and
   using the at least one task priority table and waiting time for the task scheduling in case it has been determined that the first task and the second task are to concurrently use the same resources relating to the system comprises:
comparing a current priority value of the first task with a current priority value of the second task; and
in case the current priority value of the first task is equal to the current priority value of the second task, performing:
accessing the at least one task priority table to obtain the first and second highest possible priority values;
selecting the first task to be scheduled for execution if the first highest possible priority value is higher than the second highest possible priority value; and
selecting the second task to be scheduled for execution if the second highest possible priority value is higher than the first highest possible priority value,
wherein the first highest possible priority value is a highest possible priority value of the first task, and the second highest possible priority value is a highest possible priority value of the second task.

2. The method of claim 1, further comprising one or more of the following steps:
providing a first priority indication of a current priority value of the first task within the first order of priority values, wherein the first priority indication is a pointer to a priority value; and
providing a second priority indication of a current priority value of the second task within the second order of priority values, wherein the second priority indication is a pointer to a priority value.

3. The method of claim 2, further comprising the step of selecting one of a plurality of tasks to be executed in the system depending on the priority indication.

4. The method of claim 2, further comprising the step of changing the current priority value of a task selected to be executed in the system to one of the lowest possible priority value and an initial priority value within its order of priority values.

5. The method of claim 2, further comprising the step of increasing the current priority value of at least one task that has not been selected to be executed in the system within its order of priority values.

6. The method of claim 2, further comprising the step of changing the current priority values of all tasks to at least one of the lowest possible priority value and an initial priority value within its orders of priority values.

7. The method of claim 1, further comprising the step of providing an initial priority value for the task within the order of priority values.

8. The method of claim 1, further comprising at least one of the steps, in case the at least two tasks have the same current priorities, of
selecting one of the plurality of tasks depending on waiting times of the at least two tasks for being executed in the system,
randomly selecting one of the plurality of tasks.

9. A nontransitory computer-readable storage medium having stored thereon a computer program product including program code portions for performing a method of scheduling tasks in a system when the computer program product is executed on one or more components of a computing device, wherein the method comprises:
providing at least one task priority table;
determining whether a first and a second task to be executed in the system are to concurrently use the same resources relating to the system; and
using the at least one task priority table and waiting time for the task scheduling in case it has been determined that the first task and the second task are to concurrently use the same resources relating to the system,
wherein:
the at least one task priority table is adapted to comprise for a first task a first sequential or non-sequential order of priority values including a first lowest possible priority value within the order of priority values and a first highest possible priority value within the order of priority values, and for a second task a sequential or non-sequential order of priority values including a second lowest possible priority value within the order of priority values and a second highest possible priority value within the order of priority values, the first and second sequential or non-sequential orders of priority values overlap, and the first and second tasks are to concurrently use the same resources relating to the system,
the first lowest, second lowest, first highest and second highest possible priority values differ from each other, and
using the at least one task priority table and waiting time for the task scheduling in case it has been determined that the first task and the second task are to concurrently use the same resources relating to the system comprises:
comparing a current priority value of the first task with a current priority value of the second task; and
in case the current priority value of the first task is equal to the current priority value of the second task, performing:
accessing the at least one task priority table to obtain the first and second highest possible priority values;
selecting the first task to be scheduled for execution if the first highest possible priority value is higher than the second highest possible priority value; and
selecting the second task to be scheduled for execution if the second highest possible priority value is higher than the first highest possible priority value,
wherein the first highest possible priority value is a highest possible priority value of the first task, and the second highest possible priority value is a highest possible priority value of the second task.

10. An electronic device adapted to schedule tasks, comprising:
at least one task priority table adapted to comprise for a first task a first sequential or non-sequential order of priority values including a first lowest possible priority value within the order of priority values and a first highest possible priority value within the order of priority values, and for a second task a sequential or non-sequential order of priority values including a second lowest possible priority value within the order of priority values and a second highest possible priority value within the order of priority values, the first and second sequential or non-sequential orders of priority values overlap, the first and second tasks are to concurrently use the same resources relating to the system; and
a task scheduler adapted to access the at least one task priority table, wherein:
the first lowest, second lowest, first highest and second highest possible priority values differ from each other; and
the task scheduler is further adapted to determine whether a first and a second task to be executed in the system are to concurrently use the same resources relating to the system and to use the at least one task priority table and waiting time for the task scheduling in case it has been determined that the first task and the second task are to concurrently use the same resources relating to the system, and the task scheduler being adapted to use the at least one task priority table and waiting time for the task scheduling in case it has been determined that the first task and the second task are to concurrently use the same resources relating to the system comprises the task scheduler being adapted to:

compare a current priority value of the first task with a current priority value of the second task; and in case the current priority value of the first task is equal to the current priority value of the second task, perform:

accessing the at least one task priority table to obtain the first and second highest possible priority values;

selecting the first task to be scheduled for execution if the first highest possible priority value is higher than the second highest possible priority value; and selecting the second task to be scheduled for execution if the second highest possible priority value is higher than the first highest possible priority value, wherein the first highest possible priority value is a highest possible priority value of the first task, and the second highest possible priority value is a highest possible priority value of the second task.

11. The electronic device of claim 10, wherein the task scheduler is adapted to perform one or more of the following:

provide a first priority indication of a current priority value of the first task within the first order of priority values, wherein the first priority indication is a pointer to a priority value; and provide a second priority indication of a current priority value of the second task within the second order of priority values, wherein the second priority indication is a pointer to a priority value.

12. The electronic device of claim 11, wherein the task scheduler is adapted to select one of a plurality of tasks to be executed in the device depending on the priority indication.

13. The electronic device of claim 11, wherein the task scheduler is adapted to change the current priority value of a task selected to be executed in the system to one of the lowest possible priority value and an initial priority value within its order of priority values.

14. The electronic device of claim 11, wherein the task scheduler is adapted to increase the current priority value of at least one task that has not been selected to be executed in the device within its order of priority values.

15. The electronic device of claim 11, wherein the task scheduler is adapted to change the current priority values of all tasks to at least one of the lowest possible priority value and an initial priority value within its orders of priority values.

16. The electronic device of claim 10, wherein the task scheduler is adapted to provide an initial priority value for the task within the order of priority values.

17. The electronic device of claim 10, wherein the task scheduler is adapted, in case the at least two tasks have the same current priorities, to provide at least one of selecting one of the plurality of tasks depending on waiting times of the at least two tasks for being executed in the device, and randomly selecting one of the plurality of tasks.

* * * * *